J. A. MATHES.
KEROSENE INCANDESCENT LAMP.
APPLICATION FILED OCT. 18, 1907.
913,746.
Patented Mar. 2, 1909.
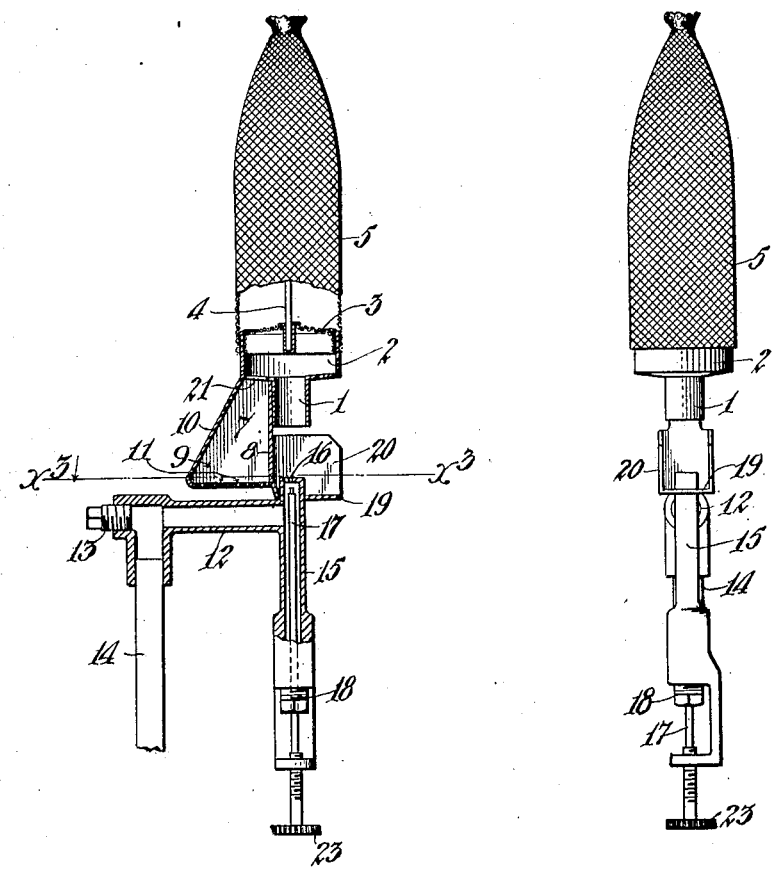
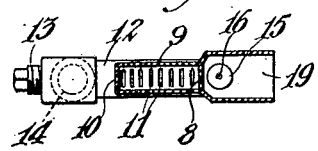
Witnesses:
Louis W. Gratz.
Frank L. Abraham.
Inventor
John A. Mathes
by Townsend Lyon & Hockley
His Attorneys

UNITED STATES PATENT OFFICE.

JOHN A. MATHES, OF CHICAGO, ILLINOIS.

KEROSENE INCANDESCENT LAMP.

No. 913,746.            Specification of Letters Patent.           Patented March 2, 1909.

Application filed October 18, 1907. Serial No. 398,041.

*To all whom it may concern:*

Be it known that I, JOHN A. MATHES, a citizen of the United States, residing at Chicago, in the county of Cook and State of Illinois, have invented a new and useful Kerosene Incandescent Lamp, of which the following is a specification.

The main object of the present invention is to provide a kerosene incandescent lamp of extremely simple construction.

A further object of the invention is to provide a construction for the above purpose in which the mantle is brought directly over the mixing chamber and the vaporizer and the several parts are brought into as compact arrangement as possible.

Another object of the invention is to provide means for heating the vaporizer by a back or sub supply from the mantle burner.

In the accompanying drawings:—Figure 1 is a vertical section of the lamp with portions in elevation. Fig. 2 is an end elevation of the lamp. Fig. 3 is a horizontal section on line $x^3$—$x^3$ in Fig. 1.

1 designates the mixing chamber, formed as a vertical tube, communicating at its upper end into a tubular enlargement or chamber 2, which constitutes the distributing chamber of the mantle burner, being closed at its top by wire gauze 3 and provided with suitable means 4 for supporting the mantle 5.

A chamber 7 extends downwardly from the chamber 2 and lies directly adjacent to the mixing tube 1, its end wall 8 being secured to or formed together with the side of tube 1. This chamber 7 enlarges downwardly, substantially wedge shaped being preferably formed with two parallel walls 9 which are joined at one end, by the vertical wall 8 in contact with the tube 1, and at the other end by a wall 10 which inclines downwardly and outwardly from the outside of the chamber 2. The bottom of this chamber 7 is slotted or perforated as at 11, for the efflux of combustible mixture, forming downwardly directed jets or flames which serve to heat the vaporizer.

The vaporizer consists of a tube 12 arranged below the chamber 7 and in the path of the jets from openings 11, this tube being closed at one end by a screw plug 13 and communicating, near said end, with an oil supply pipe 14 and at the other end with a vertical tube 15 having a vertical outlet 16 below and in line with the mixing chamber tube 1. This outlet is closed or opened by a valve 17 whose stem passes through a packing nut 18 and has an operating handle or head 23. The upper end of tube 15 extends above the vaporizer tube, and through the bottom 19 of a shield or inverted head whose side plates 20 inclose the outlet tube 15 on each side leaving, however, the side opposite to the distributing chamber 7, open or exposed. These side plates 20 terminate somewhat below the level of the bottom of tube 1. The shield 19, 20 is formed as an extension from the sub-distributing chamber 7.

The extension is preferably expanded laterally so as to permit of the free circulation of the air around the jet of vapor so as to be carried therewith up into the mixing chamber, and by arranging the jets from the subburner at the bottom of the chamber 7, from near the inlet to the vaporizer to the outlet the oil in passing to the outlet is subjected to such a degree of heat that it is thoroughly vaporized before it is discharged up between the wings of said extension into the mixing chamber, thereby securing a very efficient result from a very neat and compact structure.

The chamber 7 communicates into the chamber 2, through an opening 21 at top of chamber 7, through which combustible mixture can pass from the chamber 2 to the chamber 7.

The operation is as follows: After the operation has been started by first heating the vaporizer by a torch, preferably with alcohol, the oil is turned on and is converted into vapor in vaporizer 12 and the jet of vapor issuing at outlet 16 mixes with air in tube 1, filling the chamber 2 and the chamber 7, communicating therewith, with combustible mixture. The velocity of the issuing vapor is sufficient to draw air into the mixing chamber with it, and to produce pressure in said chamber. The mixture passes partly out through the gauze top of chamber 2 and is ignited by holding a torch or match thereto, so that said vapor by its combustion causes incandescence of mantle 5. Another part of the mixture passes through sub-distributing chamber 7 and out through slots 11, the flames issuing from said slots 11 serving to heat the vaporizer to generate vapor from the oil therein. The heat from these flames, in conjunction with the heat transmitted from the mantle burner, serves also to maintain the mixing chamber at proper temperature, all of these parts being in conducting contact and proximity.

In case the vaporizer heating flames should become extinguished, the vapor from openings 11 will rise and become ignited at the mantle, so that the flame will pass to the lower burners and will restore the ignition thereat.

What I claim is:—

1. In an incandescent vapor burner for lamps, a shield comprising a perforated bottom and two forwardly extending, vertically arranged wings, a wall extending vertically from said bottom at the rear of and between said wings having a vertically arranged mixing tube on one side in substantial alinement with said perforation, and a substantially wedge shaped chamber on the other side, the bottom of said chamber being perforated and adapted to overhang the generator, said shield being wider than said chamber and the wings thereof projecting forward beyond the front of said tube with their upper edges below the level of the bottom thereof, and a distributing chamber on top of and communicating with the mixing tube and with said wedge shaped chamber, the top of the distributing chamber being perforated and adapted to support an incandescent mantle.

2. In an incandescent, vapor burner lamp, a horizontally arranged generator, with a screw plug at the inlet end and a vertically arranged tube at the outlet end, said tube extending above the generator and provided with an outlet, a valve in said tube for regulating said outlet, a wall extending vertically from one side of the upwardly projecting portion of said tube, having a mixing chamber at its upper end in alinement with the outlet of said tube and a substantially wedge shaped chamber on the other side overhanging the generator longitudinally, the bottom of the wedge shaped chamber being perforated so as to project a flame down onto the generator, an enlarged distributing chamber on top of said two chambers and communicating therewith, the top of the distributing chamber being perforated and provided with means for supporting an incandescent mantle, and a shield extending forwardly from the wedge shaped chamber comprising a bottom and two sides, the bottom being perforated and fitting over the upwardly projecting portion of said tube, and the sides extending forward beyond said tube and mixing chamber and having their upper edges below the level of the bottom of the mixing chamber.

In testimony whereof, I have hereunto set my hand at Chicago, Illinois, this 16 day of October 1907.

JOHN A. MATHES.

In presence of—
GEORGE BETTS,
W. SULLIVAN.